C. HOCHBRUNN.
Flower Frame.

No. 79,122.

Patented June 23, 1868.

Witnesses:

Inventor:

United States Patent Office.

C. HOCHBRUNN, OF NEW YORK, N. Y.

Letters Patent No. 79,122, dated June 23, 1868.

FLOWER-FRAME.

*The Schedule referred to in these Letters Patent and making part of the same.*

TO ALL WHOM IT MAY CONCERN:

Be it known that I, C. HOCHBRUNN, of the city, county, and State of New York, have invented a new and improved Frame for Flowers; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
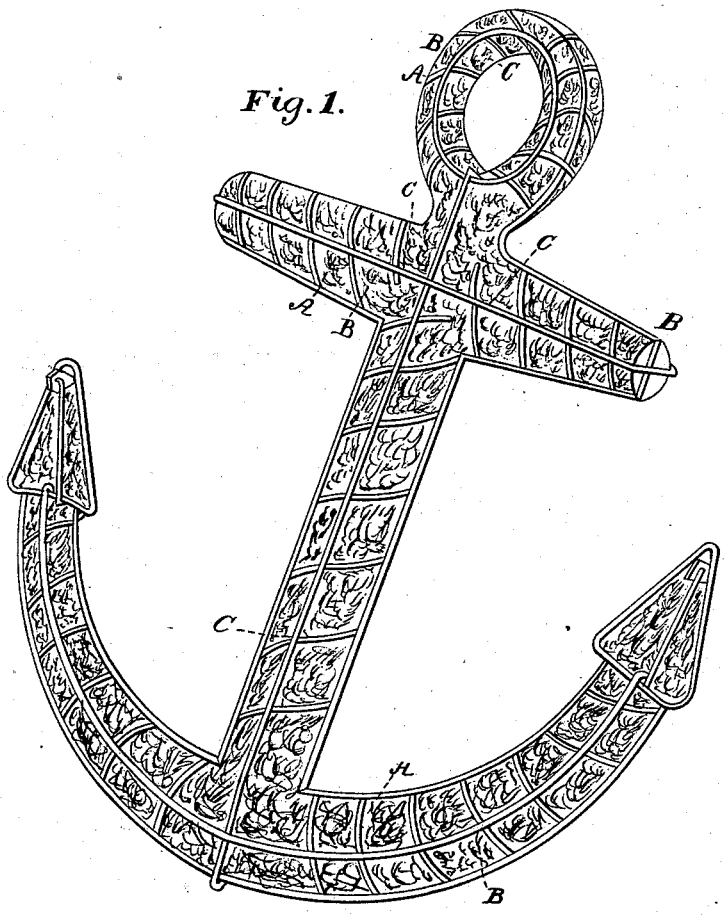
Figure 1 represents a perspective view of my improved frame.
Figure 2:
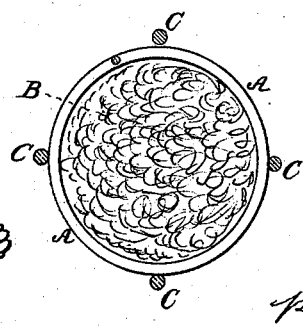
Figure 2 is a detail transverse sectional view, on an enlarged scale, of the same.

This invention relates to a new manner of constructing the frames for flower-ornaments of that class in which suitable designs, such as wreaths, anchors, hearts, stars, &c., are made of amaranths or other suitable flowers or plants.

The invention consists in making these frames by winding wire around moss, and by strengthening the whole by means of strong wire or other stays. Heretofore, such frames were made of wire, in such form that they had a semicircular cross-section, into the concave side of which the moss had to be stuffed by the florist.

In my frame, the moss is already held when the florist receives it, and he has, therefore, only to fasten the flowers around the frame, which facilitates his work to a considerable degree.

Instead of moss, any other suitable filling may be used.

A, in the drawing, represents the wire, wound around the moss or other filling, B, in such a manner as to produce the required design. The frame is then braced and retained in the required form by means of stay-rods, C C, which are made of wire or other suitable material.

Having thus described my invention, what I claim as new, and desire to secure by Letters Patent, is—

The frame for flower-ornaments, constructed and arranged as herein shown and described.

C. HOCHBRUNN.

Witnesses:
 WM. F. McNAMARA,
 ALEX. F. ROBERTS.